United States Patent [19]

Holloway et al.

[11] 4,060,335
[45] Nov. 29, 1977

[54] SPADE DRILL

[75] Inventors: William Stuart Holloway, St. Charles, Ill.; Manfred Grunsky, Dreieichenhain, Germany

[73] Assignee: Amtel, Inc., Providence, R.I.

[21] Appl. No.: 735,143

[22] Filed: Oct. 26, 1976

Related U.S. Application Data

[63] Continuation-in-part of Ser. No. 595,607, July 14, 1975, abandoned.

[30] Foreign Application Priority Data

Mar. 4, 1976 Germany .............................. 2608809

[51] Int. Cl.² .............................................. B23B 27/16
[52] U.S. Cl. ...................................... 408/233; 407/54
[58] Field of Search ............... 408/233, 226; 175/383; 279/41; 29/96, 105 R, 105 A

[56] References Cited

U.S. PATENT DOCUMENTS

| 1,210,153 | 12/1916 | Dusha et al. | 279/41 X |
| 2,521,035 | 9/1950 | Boyle | 29/105 R |
| 2,575,239 | 11/1951 | Stephens | 175/383 |
| 2,590,053 | 3/1952 | Taylor | 408/226 X |
| 2,945,288 | 7/1960 | Berry | 29/105 R |
| 3,076,357 | 2/1963 | Benjamin et al. | 408/233 X |
| 3,217,384 | 11/1965 | Wirfelt | 29/105 A |
| 3,831,237 | 8/1974 | Gunsalus | 29/105 R |
| 3,878,905 | 4/1975 | Schaumann | 175/383 |
| 3,965,553 | 6/1976 | Faber | 29/96 |

FOREIGN PATENT DOCUMENTS 2,250,925 10/1972 Germany .............................. 29/96

Primary Examiner—Leonidas Vlachos
Attorney, Agent, or Firm—Barlow & Barlow

[57] ABSTRACT

A spade drill is provided with a holder for a spade cutting blade which is clamped in a slot of the holder by means of a clamp screw. The spade cutting blade is essentially formed with a cutting surface coming to a central point and of the same shape as the first cutting surface with an abutment surface located within the spade drill holder in the clamping slot which receives the cutting surface for holding the bit in place with means in the form of a clamp located across the clamping slot to grip the spade drill bit.

5 Claims, 17 Drawing Figures

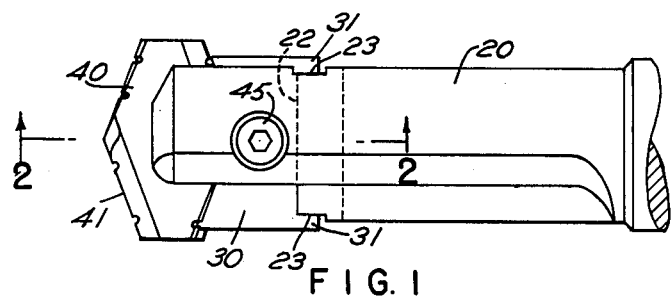
FIG. 1
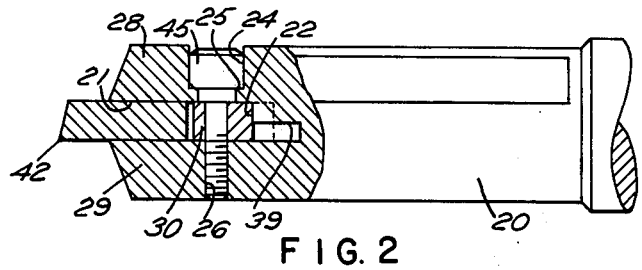
FIG. 2
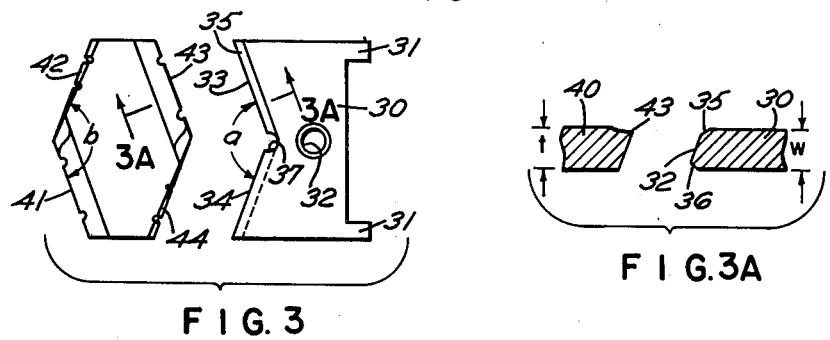
FIG. 3
FIG. 3A
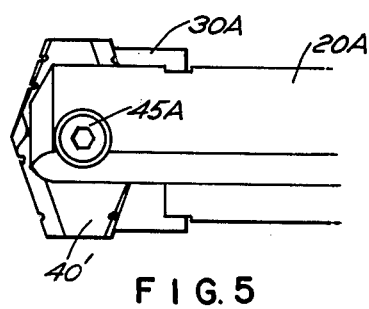
FIG. 5
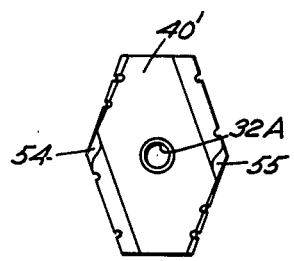
FIG. 6

SPADE DRILL

CROSS REFERENCE TO RELATED APPLICATION

This application is a continuation-in-part of our previous co-pending application Ser. No. 595,607 filed July 14, 1975 and now abandoned.

BACKGROUND OF THE INVENTION

Presently available spade drills are subject to rapid dulling of the cutting edges so the cutter requires frequent sharpening, thereby increasing labor costs and downtime of a machine utilizing the drill. Additionally, the process of re-grinding requires skilled specialist in order to provide the proper rake angles. Conventional forms of prior spade drills are shown as, for example, in U.S. Pat. No. 2,400,856; U.S. Pat. No. 3,076,357 and British Pat. No. 1,270,068. The only approach towards providing a replaceable insert in a drill design known to applicants is that illustrated in U.S. Pat. No. 3,540,323 where carbide inserts are used in a drill structure. This approach, however, does not yield a balanced drilling device since the one carbide insert is located from the outside of the bore to a point approximately half way into the center of the radius of the bore and a second insert cuts the material from the center of the bore up to and beyond this half way point on the radius.

SUMMARY OF THE INVENTION

According to the invention a balanced spade drill type cutter is provided by making a spade cutting blade with two drill bit surfaces, one located opposite the other so that, in effect, the spade cutting blade is double edged so that it may be used twice as frequently as a normal spade drill cutting blade which is provided with only one drilling edge. In accordance with the invention when the cutting edge is worn out on one cutting edge, the opposite cutting edge may be used after a 180° rotation of the spade cutting blade. In this fashion the spade cutting blade may effectively be a throw-away device so that when the blade wears out and both cutting sides have been used, a new blade may be inserted and if the blade is not too damaged, it can be re-ground by a specialist. In order to support the spade cutting blade, the abutment surface against which the cutting blade seats is formed to conform to the shape of the cutting edge of the drill bit. In some cases the abutment surface against which the cutting blade seats may be formed by an insert piece which may face a diametrically cut floor in a clamping slot and in order to insure that the clamping slot grips the cutting blade, the insert piece would be made thinner than the thickness of the cutting blade so that when a clamping screw is tightened that extends diametrically across the clamping slot full clamping power takes effect on the cutting blade. Furthermore, it is advantageous that the abutment surface facing the cutting blade be formed in a fashion where the cutting edge is not by chamfering the surface forming it on a radius and by other techniques. In addition, it is preferable to provide the abutment surface facing the spade cutting blade by an included angle which is smaller than the included angle of the cutting face of the cutting blade so that a lateral steady position of the cutting blade is insured. Further the abutment surface should be provided with relief for the point of the cutting blade.

DESCRIPTION OF THE DRAWINGS

FIG. 1 is a top plan view of a spade drill made in accordance with the invention;

FIG. 2 is a side elevational view thereof partly in section, the section being taken on lines 2—2 of FIG. 1;

FIG. 3 is a detached plan view of the cutter blade and an insert for use therewith;

FIG. 3A is a partial sectional view taken on lines 3A—3A of FIG. 3 illustrating the form of the abutment surface of the insert;

FIG. 5 is a partial plan view of a spade drill and holder of a slightly modified form;

FIG. 6 is a plan view of the cutter blade for use with the modified form of FIG. 5;

DESCRIPTION OF THE PREFERRED EMBODIMENT

Figure 4:
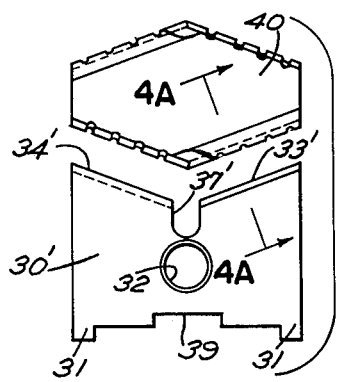
FIG. 4 is a detached plan view of a slightly modified form of a spade cutting blade with a different insert.

Referring now to the drawings there is shown in FIG. 1 a spade drill holder bar 20 which has at the end remote from the driving end a diametrical slit or slot 21 cut therein. The bottom end of the slot 21 defines a floor 22 and at either end of the floor 22 a notch 23 is cut into the wall of the holder 20 and extending across the slot 21 is a bore 24 which bore is provided with a shelf 25 in one half of the holder, while the other half of the holder has a threaded section as at 26.

An insert 30 is provided with a pair of protrusions 31 and an aperture 32 (see particularly FIG. 3). The insert 30 is adapted to be placed against the floor 22 of the slot and the protrusions 31 rest in the cutout portions 23 so that lateral movement thereof in the slot 21 is prevented. The side of the insert 30 opposite the protrusions 31 is formed with a pair of surfaces 33 and 34 which enclose an acute angle $a$. The edges of the surfaces 33 and 34 are chamfered as at 35 and 36 (see FIG. 3A) and at the intersection of these surfaces a notch 37 is cut into the insert.

A double bladed spade cutting blade 40 is provided for association in the slot or slit 21 and this blade is formed with two opposite sets of cutting edges 41, 42, 43, 44 thereon. These cutting edges enclose an angle $b$ which is equal to or a little larger than the angle $a$ defined by the insert 30. In addition, the thickness $t$ of the cutter blade 40 (see FIG. 3A) is more than the thickness w of the insert 30. It will be apparent by examining the drawings that the first drill bit of the cutting insert is formed by the cutting surfaces 41 and 42 and a second drill bit is formed by the cutting surfaces 43, 44 shaped just like the first set of surfaces so that when the first cutting surfaces are worn out, the cutting blade 40 need only to be rotated 180° and in that manner the second set of cutting surfaces will come into working position.

The clamping slot 21 is provided with an extension slot 39 which extends from the bottom wall 22 to allow for a greater bending moment between the two legs on opposite sides of the slit which are designated by the reference numerals 28 and 29. As will be seen in FIGS. 1 and 2, when the cutting blade is inserted into the slot 21, the cutting surfaces 43 and 44 effectively rest against the abutment surfaces 33 and 34 of the insert 30 but not throughout their entire length since as has been mentioned before, the angle $a$ is equal to or a little smaller than the angle $b$ on the cutting blade 40. Thus, when the cutting blade is being used, the feed pressure of the spade drill is such to maintain the cutting blade centered. To retain the cutting blade in the slot 21, the clamp screw is screwed into its threaded bore 26 to pull the two legs 28 and 29 together and due to the fact that an extension slot 39 is provided, the legs will come together onto the cutting blade 40 but will not clamp against the holder or insert 30 which is of smaller thickness. It will also be apparent that in lieu of changing the thickness of the blade and insert it is also possible to choose the slot width of the clamp slot 21 in the area of the insert 30 larger than in the area of the cutting blade 40. The positioning of the slot 39 acting as a continuation of the main slot 21 as it lies against the leg 29 is such that a greater bending moment will occur on the leg 28 than the leg 29.

Figure 4A:
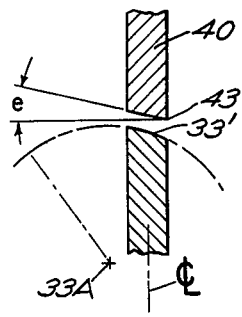
FIG. 4A is a partial sectional view taken on lines 4A—4A of FIG. 4.

In the embodiments of FIGS. 4 and 4A the cutting blade 40 is executed in the same fashion as that in connection with the first embodiment but the insert 30' is of slightly different construction. In this case the seating surface of the insert is provided with a cutout portion 39 which will seat into a corresponding protrusion in the floor 22 of the holder 20 to improve the centering of the insert 30'. In addition, the central cutout 37' is cut somewhat deeper than in the previous embodiment. Of greatest importance, however, is the fact that the abutment surface sections 33, 34' are curved on a radius as illustrated in FIG. 4A. The axis of curvature designated 33A lies parallel to the blade plane surface and eccentric to the axis of rotation CL. For practical reasons the eccentricity is chosen to avoid the touching of the abutment surface 33' against the cutting edge 43 as seen in FIG. 4A. This formation of an abutment surface for the cutting blade also permits different front lip clearance angles e being utilized in the cutter blades 40 without changes in the insert piece. In addition in the embodiment of FIGS. 4 and 4A the insert 30' is approximately as wide as the cutting insert 40 to provide a large area of support. In some cases a detent may be provided to engage a protrusion on the slit wall, so the cutter blade will be retained on the retraction stroke.

The embodiments of FIGS. 5 and 6 present a slightly different manner of gripping the cutting insert. In this arrangement as will be seen firstly in FIG. 6 the cutter blade 40' is provided with a bore 32A through which a clamp screw 45A may pass. In this arrangement the insert 30A is made in the fashion of the previously described inserts but of somewhat shorter direction in the longitudinal sense of the holder 20A and the clamp screw bore is placed somewhat nearer the end of the holder 20A. In all other respects the arrangement is similar to that previously disclosed, the advantage of having the clamp screw passing through the cutter blade being seen when excessive withdrawal pressures can be developed through the boring of certain types of materials.

Figures 6A, 6B:
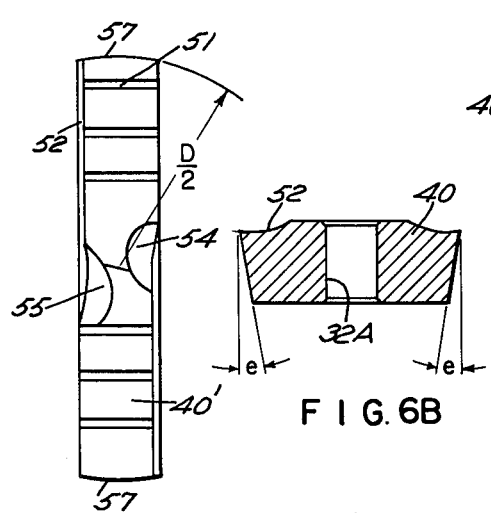
FIG. 6A is an end view of the spade cutting blade of FIG. 6 drawn on an enlarged scale illustrating the cutting blade geometry.
FIG. 6B is a sectional view taken on lines 6B—6B of FIG. 6 and drawn on an enlarged scale illustrating further cutting geometry of the cutting blade.

Referring now specifically to FIGS. 6A and 6B, the cutting blade geometry has been illustrated in magnified form on the drawings and it will be seen that the blade is provided with chip separating grooves 51 which run substantially perpendicular to the plane of the cutting blade surface. As shown in the drawings, the cutting blade is provided with a cutting lip or rake surface sometimes also known as a hook rake which is designated 52 and which generally runs parallel to the cutting edge of the blade 40. In FIG. 6B this is shown as a radius but it need not be a radius and could just as well be an angle. It does, however, provide a situation where it is necessary to develop a point for the cutting blade, and accordingly, to achieve this a web thinning cut or grind 54 and 55 is formed into the rake surface. It will be seen that referring to FIG. 6B that, in effect, with this particular geometry, that a positive chip angle is provided. Further in a preferred form the cutting blade may have its outer surfaces 56, 57 rounded off according to a radius D/2 which is in accordance with the diameter of the hole to be drilled. In this fashion this will allow greater guiding surface for the blade than the usual guiding ribs. It will be apparent to those skilled in the art that the particular geometry of the cutting blade herein disclosed has certain advantages should at least one re-grind of the blade be desired. Firstly, it does not become necessary to utilize a special re-grinding fixture to produce the cutting lip or rake surface 52 since this is a constant flat rake. Further it will be obvious that the web or the point relief that is necessary by putting in the grinding areas 54 and 55 is more simply done that by providing an angle to the cutting edge rake angle grind.

Figure 7:
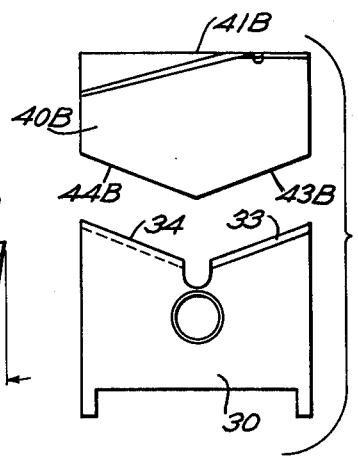
FIG. 7 is a detached plan view of an alternate form of insert and cutter blade.

Referring now to FIG. 7 a slightly altered embodiment of a cutting blade for use with the insert 30 has been illustrated. This particular cutting blade is formed as a flat bottom blade 40B having the usual cutting edge rake angle, and the opposite edge to the cutting edge 41B is formed at an angle to seat on edges 43B, 44B. This form of cutter insert provides the adaptability of having two types of spade drill configurations that can be utilized on quick interchangeability, namely a standard spade drill blade which has the usual included angle for drilling or a flat bottom blade 40B. It will be apparent that after the drill of the normal spade drill type has come to the end of its useful insertion into the hole being bored, it may be readily taken out of the holder and replaced by a flat bottom blade in quick fashion so as to yield a bore with a flat bottom hole rather than a conical end surface in the bore.

Figure 9:
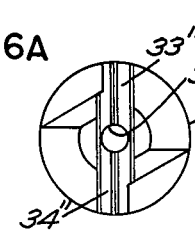
FIG. 9 is an end view thereof.
Figure 8:
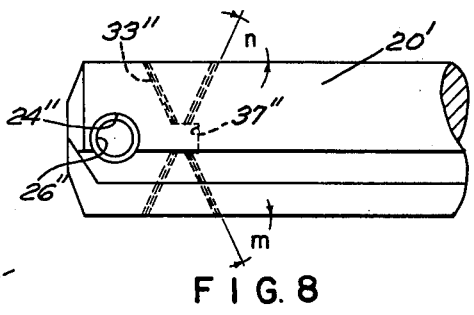
FIG. 8 is a partial top plan view of a further modified spade drill holder.
Figure 10:
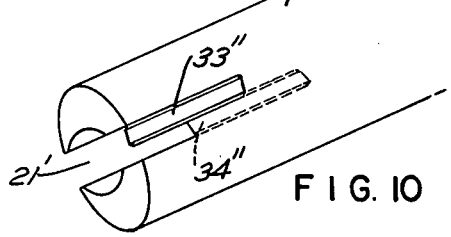
FIG. 10 is a perspective view thereof looking at the abutment surfaces formed in the holder for a cutter blade similar to that illustrated in FIG. 6.

Referring now to FIGS. 8, 9 and 10 a further arrangement of a spade drill holder for use with a cutting blade similar to that shown in FIG. 6 has been illustrated. In this situation we have a holder 20' which has the clamping slit or slot 21' formed by two milling cuts. For example, a first cut is taken on an angle m (see FIG. 8) to provide an abutment surface 33" and then a second milling cut is taken to finish the width of the clamping slot 21' by making another angle cut at an angle n to the axial extent of the holder 20' and this will produce a second abutment surface 34". Each of these abutment surfaces extend effectively completely across the diameter of the tool holder as seen in FIG. 8 but for only half of the width of the clamping slot 21'. In addition to provide relief for the point of the cutter blade an axially located hole may be bored as at 37" and as in the embodiments of FIGS. 5 and 6 clamping bores 24" and 26" are provided to clamp the cutter insert such as 40' into the holder 20'. This particular method of providing for an abutment surface facing the spade cutting blade automatically provides for the necessary relief for the cutting edges of the cutting blade, and this cutting blade may be readily clamped into its holder. The arrangement that is provided eliminates one loose part that may be advantageous in certain machine shop operations. It should be understood that the angles m and n are chosen in the same fashion so that the included angle that was discussed as the included angle a will have the same geometry as that discussed in connection with the insert 30 as illustrated in FIG. 3.

Figure 11:
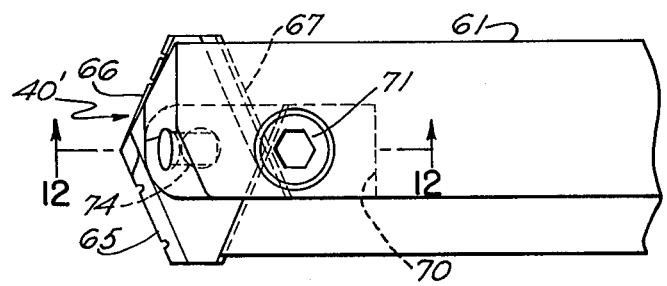
FIG. 11 is a top plan view of a further modified spade drill holder.
Figure 12:
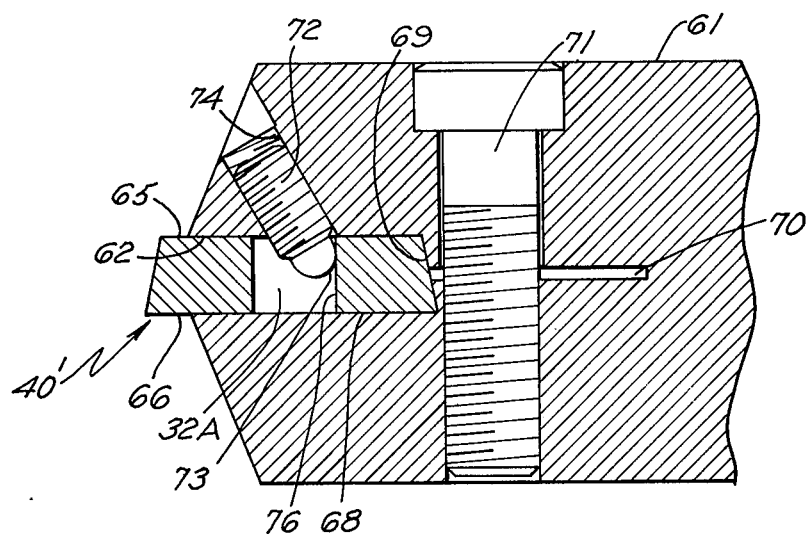
FIG. 12 is a sectional view taken on lines 12—12 of FIG. 11 drawn to an enlarged scale.

In FIGS. 11 and 12 a modified spade drill holder 61 has a clamping slot 62 that is cut into one end of the holder on a diameter thereof. Into this slot the spade drill blade 40' is inserted with its two cutting surfaces opposite one another in the feed direction. One set of cutting edges are located as at 65,66 while the opposite set of cutting edges are located as at 67, 68. The bottom wall 69 of the clamping slot serves as abutment surface for the spade drill blade and consists of two surfaces that lie at an angle to each other which is preferably not equal to the external angle of the cutting surfaces but is only nearly so. As previously discussed, the bottom wall of the clamping slot should be treated in such a fashion that the cutting edges themselves are not engaged by the bottom wall so as to prevent damage to the ground cutting surfaces. Also as in the previous embodiments an extension slit 70 may be provided into the holder transversely thereof and in the region of this extension slit 70, a clamp screw 71 is provided and threadingly engages at least the lower portion of the holder as viewed in FIG. 12.

To insure that the drill bit is held in the slot and is prevented from being pulled out therefrom, a threaded screw 72 having a generally spherically rounded end 73 is screwed into a threaded bore 74 that extends from the end face of the holder 71 obliquely to the rotational axis 64, the screw being inserted to a depth to engage an aperture in the form of a bore 32A that exists in the drill blade. As will be seen in FIG. 12, the spherically rounded end 73 will engage the wall 76 of the bore 32A and by tightening up the screw 72, the spade drill blade will be pressed against the bottom wall 69 of the slit, and in this way the blade will be positively held in the holder even when it is jammed in the workpiece bore or being withdrawn therefrom. It should be noted that when the screw 72 is tightly engaged with the bore 32A of the cutter blade that it exerts practically no force on the cutter blade except a force in the axial direction of the holder, there being a point contact between the spherical surface 73 and the wall 76. The action of the screw 72, therefore, does not tend to spread apart the clamping slot, and the clamp screw 71 will firmly clamp the face of the drill bit.

Figure 13:
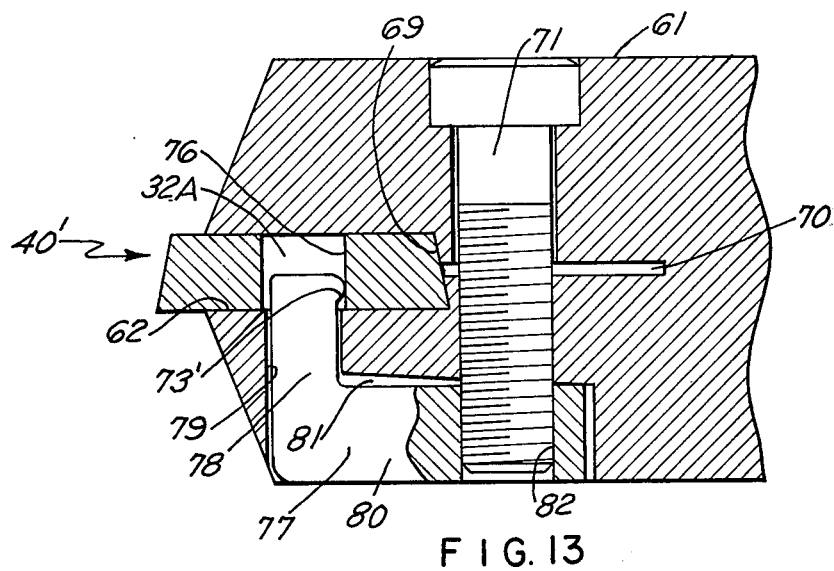
FIG. 13 is a central sectional view of a still further embodiment of a spade drill holder.

Referring to FIG. 13, a further embodiment is illustrated in which the mechanism holding the blade from being withdrawn from the clamping slot is a doglegged part 77 which has one arm 78 that is loosely received in a passage 79 that lies in one clamp slot arm and thence into the bore 32A. The second arm 80 is recessed into an axial groove 81 in the drill bit holder 61. The clamp screw 71 engages a threaded bore 82 at the end of the arm 80. At the end of the first arm 78 a spherically rounded surface 73' is provided which contacts the wall 76. When clamp screw 71 is tightened up, the part 77 pivots clockwise as seen in the drawing about the end of arm 80 and elastically deforms, and in this way there will be an axial component of force exerted on the drill bit by the spherical surface 73'. In this embodiment there is an advantage that only one clamp screw needs to be tightened up to press the drill blade firmly against the bottom wall 69 and to tighten up the clamp slot.

It will, therefore, be seen that this invention provides for a spade drill in which the cutting blade can effectively be a replaceable element that is readily clamped into a clamping slit or slot and is one which is economical to produce and one which can readily be of the throw-away variety or can be manufactured in carbide instead of tool steel. The fact that regrinding is not necessary makes special surface treatment of the spade cutting blade possible so as to increase wearability thereof, and furthermore the cutting edge rake angle may be chosen with more latitude than is possible when one has to regrind a blade.

We claim:

1. Spade drill having a holder and a spade cutting blade said holder having a clamp slot and a clamp screw which passes through the clamp slot perpendicularly to its clamp surfaces, said holder clamping slot having a narrow extension into the bottom thereof and diametrically across the holder on an axial plane thereto, said blade being received in said slot in such a way that the drill bit of the spade cutting blade sticks out of the clamp slot in feed direction, and the spade cutting blade rests against an abutment surface in said slot to seat it and avoid a sideways movement of the spade cutting blade, said abutment surface being V-shaped with respect to an axial plane of said holder, the included angle of the abutment surface being smaller than the included angle between the cutting surfaces of the cutter blade, the side of the spade cutting blade located across from the exposed drill bit surface having a second drill bit surface whose shape corresponds to the one of the first drill bit surface, said spade drill blade being provided with a central aperture and being urged against the abutment surfaces by means of a holding piece which passes through the one clamp slot arm and engages said central aperture of the spade cutting blade substantially on the central rotational axis of the holder.

2. A spade drill as in claim 1 wherein the holding piece is a screw that passes through the holder in the region of the extension slit transversely to the plane of the blade.

3. A spade drill as in claim 1 wherein the holding piece is formed as a two-armed angle piece which is movably mounted in the plane of its arms and engages with its one arm into the aperture of the spade cutting blade with accompanying bending of the angle of the angle piece.

4. A spade drill as in claim 1 wherein the cutting blade surfaces have rake surfaces adjacent the cutting edges, said rake surfaces extending parallel to the plane of the spade cutting blade, said rake surfaces continuing at their end near to the rotational axis into an oblique web relief surface inclined towards the rotational axis, the forward edge of which oblique surfaces forms an auxiliary cutting edge.

5. A spade drill having a holder, said holder having a clamp slit therein on a diameter thereof at the free end thereof, said slit lying in an axial plane of said holder and having a bottom wall defined by two angularly disposed surfaces, each surface subtending over one half the thickness dimension of said slit, a cutter blade having two opposite sides formed at an angle to each other to produce a drill bit form, each of said bottom wall surfaces receiving respectively one side only of the cutter blade, and means clamping said blade in said clamping slit so that the drill bit of the cutter blade protrudes out of the clamp slit in a feed direction and the cutter blade rests against the bottom walls of said slit to seat the cutter blade, said spade drill blade being provided with a central aperture and being urged against said angularly disposed surfaces by means of a holding piece which engages said central aperture of the spade cutting blade substantially on the central rotational axis of the holder.

* * * * *